UNITED STATES PATENT OFFICE.

WILLIAM N. BLAKEMAN, JR., OF NEW YORK, N. Y.

PROCESS OF IMPARTING DRYING PROPERTIES TO PIGMENTS.

SPECIFICATION forming part of Letters Patent No. 702,173, dated June 10, 1902.

Application filed October 31, 1899. Serial No. 735,438. (No specimens.)

*To all whom it may concern:*

Be it known that I, WILLIAM N. BLAKEMAN, Jr., of the borough of Manhattan, in the city, county, and State of New York, have invented a new and useful Process of Imparting Drying Properties to Pigments, which invention is fully set forth in the following specification.

The object of this invention is to treat pigments used in the manufacture of paints in such manner that when ground in oil the paints produced will exhibit quicker drying properties than the mixture now in use.

Heretofore in the manufacture of paints the general practice has been to grind the pigment in an oil vehicle and add to the paint thus formed, either at the time of grinding or subsequently, such "driers" or drying agents as it might be desired to use.

I have discovered that if instead of adding driers at the time of or subsequent to grinding the pigment in oil an oxidizing-drier be first incorporated with the pigment and the pigment then ground in the usual oil vehicle a paint will be produced which will exhibit quicker drying properties and be more satisfactory in every way.

My invention therefore consists in incorporating an oxidizing-drier with a pigment before the pigment is ground in oil, and I carry out this process by, first, attenuating the drier in a volatile vehicle or solvent; second, incorporating this solution with the pigment, and, third, evaporating the solvent or liquid portion thereof.

The term "drier" as used herein is intended to include all substances of animal or vegetable origin which will absorb oxygen and pass from a lower to a higher state of oxidation and transmit or carry their oxygen to oxidizable matter with which they may come in contact, and the term also includes all metallic or mineral substances which carry oxygen in combination and will yield a portion of such oxygen to any oxidizable matter with which said substance may be incorporated. Examples of driers are the drying-oils, the turpentines, the resin acids, the acid resins, and the metallic oxids and salts. One or more of these driers may be used in my process, or a commercial liquid drier, if desired.

As a practical illustration of my process the following may be given: I select sulfate of manganese (a metallic salt) and attenuate it by dissolving one-fourth to one-half of one per cent. in one hundred parts of water. This solution I thoroughly incorporate with one hundred parts of pigment and then evaporate the water before the pigment is ground in oil. Any pigment so treated will be found when ground in oil to have the drying effect greatly accelerated.

As showing the improved results obtained by my process of treating a pigment with a drier, instead of adding the drier to the oil or paint in the usual manner the following experiments which I have made may be referred to: A mixture of linseed-oil and two hundred per cent. of white lead, with the usual amount of commercial drier (turpentine-japan) added to the mixture in the usual way, dried in six and one-half hours, whereas a mixture of linseed-oil and two hundred per cent. of white lead, the lead pigment being first treated by my process with one-fifth of one per cent. of manganese acetate, under similar climatic conditions dried in five hours, thus effecting a saving in time of one hour and a half over the previous mixture. A mixture of linseed-oil and two hundred per cent. of white lead, the oil being previously treated in the usual way with one-fifth of one per cent. of manganese acetate, dried in five and three-quarter hours, whereas a mixture of linseed-oil with two hundred per cent. of white lead, the lead pigment being first treated by my process with one-fifth of one per cent. of manganese acetate, dried under similar climatic conditions in four and half hours, thus effecting a saving in time of one hour and a quarter over the previous mixture.

If zinc-white be the pigment treated, it will be found when ground in oil to exhibit drying properties equal to lead and linseed, and will also be found when treated with certain driers (manganese, for example) to possess great body or spreading power and be equal to double its quantity of "Dutch-process" lead.

Certain pigments, among them zinc-white, treated with a drier by my process and then ground in a non-drying oil, such as cotton-seed oil, will produce a remarkable effect of imparting drying properties to the non-drying oil, as described in my application for patent filed January 2, 1900, Serial No. 59, and a paint compound so formed will, although made with a non-drying oil, dry and harden in a perfectly satisfactory manner.

The selection of a volatile vehicle or solvent for attenuating the drier used can be made by any one skilled in this branch of chemisty. Water, the alcohols, spirits, ethers, spirit of turpentine, and the naphtha group of paraffins are all available for use.

If it be desired to incorporate with the pigment any of the commercial liquid driers known as "japans" and the like, the commercial drier selected, if it be a turpentine drier may be attenuated with one of the naphtha group of paraffins and then incorporated with the pigment and the naphtha then evaporated and recovered through a condenser. If a spirit drier be selected, it may be attenuated with alcohol, then incorporated with the pigment, and the alcohol then evaporated.

The percentage of drier to pigment may be regulated as practice shall dictate. Heat may be applied whenever found advisable.

Zinc-white, white lead, or any other pigment may be treated by my process.

In my application No. 734,698, filed October 25, 1899, I have described a process in which a drier and a separate body-giving agent are combined with a pigment. In the process herein described, however, no separate body-giving agent is used in addition to the drier.

Having thus fully described my invention, I claim—

1. The process herein described of imparting quicker drying properties to oil pigments, which consists in first attenuating an oxidizing-drier in a volatile vehicle, then incorporating such attenuated drier with a pigment, and then evaporating the vehicle.

2. The process herein described of imparting quicker drying properties to oil pigments, which consists in first attenuating an oxidizing-drier in a volatile vehicle, then incorporating such attenuated drier with a pigment, then evaporating the vehicle, and then grinding the pigment in oil.

3. The process herein described of imparting quicker drying properties to oil pigments, which consists in first attenuating a salt of manganese in a volatile vehicle, then incorporating the same with a pigment, and then evaporating the vehicle.

4. The process herein described of imparting quicker drying properties to oil pigments, which consists in first attenuating a salt of manganese in a volatile vehicle, then incorporating the same with a pigment, then evaporating the vehicle, and then grinding the pigment in oil.

5. The process herein described of imparting quicker drying properties to zinc-white pigment, which consists in first attenuating an oxidizing-drier in a volatile vehicle, then incorporating such attenuated drier with the zinc-white, and then evaporating the vehicle.

6. The process herein described of imparting quicker drying properties to zinc-white pigment, which consists in first attenuating an oxidizing-drier in a volatile vehicle, then incorporating such attenuated drier with the zinc-white, then evaporating the vehicle, and then grinding the pigment in oil.

7. The process herein described of imparting quicker drying properties to zinc-white pigment, which consists in first attenuating a salt of manganese in a volatile vehicle, then incorporating the same with the zinc-white, and then evaporating the vehicle.

8. The process herein described of imparting quicker drying properties to zinc-white pigment, which consists in first attenuating a salt of manganese in a volatile vehicle, then incorporating the same with the zinc-white, then evaporating the vehicle, and then grinding the pigment in oil.

9. As a new article of manufacture, a dry pigment having an oxidizing-drier combined therewith, substantially in the proportions specified.

10. As a new article of manufacture, a dry pigment composed of zinc-white and having an oxidizing-drier combined therewith substantially in the proportions specified.

11. As a new article of manufacture, a dry pigment having a salt of manganese combined therewith, substantially in the proportions specified.

12. As a new article of manufacture, a dry pigment composed of zinc-white and having a salt of manganese combined therewith before grinding it in oil, substantially in the proportions specified.

WM. N. BLAKEMAN, JR.

Witnesses:
FRANCIS P. REILLY,
G. A. STIMPSON.